Dec. 8, 1964     KUNJU CHATANI     3,160,084
SHUTTER MECHANISM
Filed April 17, 1962
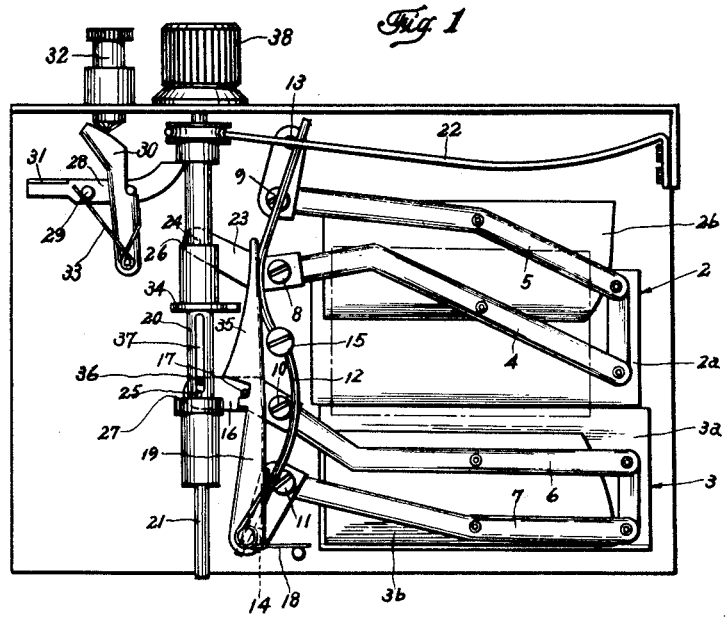
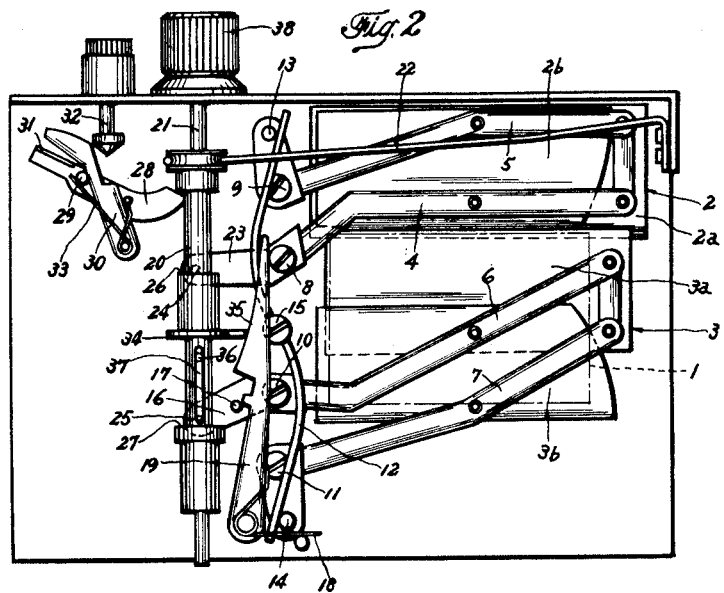
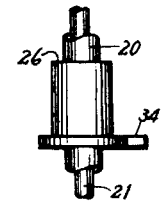
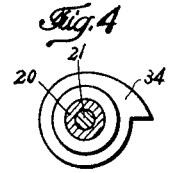

United States Patent Office 3,160,084
Patented Dec. 8, 1964

3,160,084
SHUTTER MECHANISM
Kunju Chatani, 136 Midorigaoka-cho, Uchide,
Ashiya, Japan
Filed Apr. 17, 1962, Ser. No. 188,029
2 Claims. (Cl. 95—57)

This invention relates to a focal plane type shutter, especially to shutter operating mechanism and exposure time controlling mechanism for such shutters.

One object of the invention is to provide improved and useful mechanism for operating a focal plane type of shutter.

Another object of the invention is to provide quite new and useful mechanism for controlling exposure time of such a shutter.

Still another object of the invention is to provide a focal plane shutter, in which the above are obtained and the exposure time can be freely and continuously varied.

Further object of the invention is to provide the foregoing in a form which is simple in construction, consisting of a relatively small number of parts, and smooth, accurate and reliable in operation, and suitable for mass-production.

Other objects will be apparent from the following description of an embodiment of the invention.

The present invention is especially adapted for shutters of the focal plane type having a pair of shutter blade groups which are so carried by their respective driving levers pivoted on the frame of the picture area at one side thereof that upon movement of said levers said blade groups run across the picture area in the transverse direction to the length of the area. This type of focal plane shutter is disclosed in applicant's U.S. Patent No. 2,975,689.

Shutter operating mechanism according to this invention comprises spring means for energizing the levers for driving the blade groups, respective means for holding said driving levers at a charged-up position to prevent them from release, a spring-urged axially movable member having means for simultaneously engaging with both said driving levers in charging-up operation and means for releasing said driving levers individually.

In addition, the exposure time of the shutter can be freely and continuously varied by exposure time controlling mechanism according to the invention, which comprises a spring-urged axially movable member which is provided at a predetermined position thereof with means for releasing, upon axial movement of said member, the mechanism for driving the first blind member of the shutter and also means for engaging, a predetermined period of time after the release of said mechanism, with a spring-urged lever to release the mechanism for driving the second blind member which has been prevented by said spring-urged lever from release, and means for varying the contact point of said engaging means with said second blind member driving mechanism.

The invention is illustrated by way of example in the accompanying drawings in which;

FIG. 1 is an elevation illustrating an embodiment of shutter mechanism of the invention in its set or charged-up position;

FIG. 2 is an elevation of the shutter mechanism of FIG. 1 after it has been released to complete an exposure;

FIG. 3 is an elevation of a cam member used in the exposure time controlling mechanism; and FIG. 4 is a plan view of FIG. 3.

Now referring in detail to the drawings, the blind members are illustrated as a pair of thin metal blade groups 2, 3 which are adapted to run across a picture window 1 in the transverse direction to the length thereof. Each of the blade groups 2, 3 comprises main blades 2a, 3a and subsidiary blades 2b, 3b respectively and the right-hand edge of each main blade 2a, 3a and the central part of each subsidiary blade 2b, 3b are connected by levers 4, 5 and 6, 7 respectively. These levers extend laterally of the left side of the picture window 1, where they are rotatably carried by pivots 8, 9 and 10, 11, respectively. All these levers act as driving levers for the shutter blade groups 2, 3.

Both the main and the subsidiary blades 2a, 2b and 3a, 3b are connected respectively by means of two pairs of levers 4, 5 and 6, 7, so that the overlapping areas of the main and the subsidiary blades 2a and 2b, 3a and 3b will gradually change through rotation of the levers 4, 5 and 6, 7 about their pivots 8, 9 and 10, 11. When the shutter is charged up, the overlapping area of the main blade 2a and the subsidiary blade 2b constituting the first blade group 2 is smallest as shown in FIGURE 1 and the picture window 1 is completely covered by the first blade group alone, whilst the second blade group 3 is positioned below the picture window 1 with its main blade 3a and the subsidiary blade 3b overlapping each other almost completely. If the levers 4, 5 are rotated counter-clockwise, the first blade group 2 gradually increases its overlapping area as it runs upwardly across the picture window 1 until it passes the picture window 1 to stay thereabove, when the overlapping area of the main blade 2a and the subsidiary blade 2b becomes largest as shown in FIGURE 2. On the other hand, on counter-clockwise movement of the levers 6, 7 the second blade group 3 runs upwardly, gradually decreasing the overlapping area of its main blade 3a and subsidiary blade 3b, contrary to the first blade group 2, until the picture window 1 is completely covered by this second blade group 3 alone, with the smallest overlapping area of the blades 3a, 3b as shown in FIGURE 2. The time lag between the running of the first blade group 2 and that of the second group 3 causes the picture window 1 to be opened and an exposure to be given to the sensitive material.

As above-mentioned, each two levers 4, 5 and 6, 7 which are connected to the blade groups 2, 3 respectively act as driving levers thereof. When one of each two levers rotates, the other follows it, and in order for the latter lever to be able to smoothly rotate simultaneously with the former one, the straight lines that connect the joining points of both the levers to the blades must be of equal length and parallel with each other.

In the illustrated embodiment, when the shutter is charged up, the lower lever 4 of the upper two levers 4, 5 and the upper lever 6 of the lower two levers 6, 7 act as driving levers for the first blade group 2 and the second blade group 3 respectively, while when the shutter is released, the upper lever 5 and the lower lever 7 work as driving levers for the first blade group 2 and the second blade group 3 respectively. In the following explanation, therefore, a distinction will be drawn between the driving levers 5, 7 which run the blade groups 2, 3 when the shutter is released and the driving levers 4, 6 which work on the blade groups when the shutter is charged up, by calling the former the main driving levers and the latter the subsidiary driving levers.

Theoretically, the shutter of the above-mentioned construction is the same as that in which each blade group consists of a single metal blade driven by a single lever.

The rotational force of the main driving levers 5, 7 of the shutter blades 2, 3 is supplied from a spring urged against the levers. In the illustrated embodiment of the invention, a single S-shaped wire spring 12 is supported at its center and both its ends are borne against the pins 13, 14 planted on each one end of the main driving levers 5, 7 to give them rotational force about their pivots 9, 11. Of course, the spring 12, which is the source of the driving force of the main driving levers 5, 7, can be replaced by any other suitable means. However, the single wire spring 12 supported at its center as shown in the drawings is simple in construction and can easily be installed. What is more advantageous, the type of spring can give the main driving levers 5, 7 equal torque which can be freely changed by adjusting a supporting metal 15 in the center of the spring.

The rotating force acting on these main driving levers 5, 7 must be held up by suitable means during the time when the shutter is in charged-up condition as in FIG. 1. This may be achieved by arresting either the main driving levers 5, 7 directly or the subsidiary levers 4, 6 indirectly as shown in the drawing, wherein a pin 17, which is mounted on an extension 16 of the subsidiary driving lever 6 from the pivot 10, is engaged by a spring-urged lever 19 pivoted at its one end, so that rotation of the subsidiary lever 6 and, consequently, running of the second blade group 3 is prevented. It may be added that means similar to the above is absent from the driving mechanism for the first blade group 2 due to lack of any such need, for the reasons explained hereinafter.

According to the present invention, the release of the shutter blade groups 2, 3, i.e., the release of the arrested subsidiary driving levers 4, 6 is affected by a shaft 20, which surrounds a supporting shaft 21 so as to be axially slidable thereon, and which is provided with a spring 22 connected thereto so as to constantly exercise downward pressure on the shaft 20. It may be added that in the illustrated construction, the charging-up of the blade groups 2, 3 is also effected by the axially movable shaft 20.

Shaft 20 is provided with shoulders 26, 27 respectively engageable with pins 24, 25 planted on the ends of the extensions 23, 16 of the subsidiary levers 4, 6 beyond the pivots 8, 10. When the shaft 20 is moved upwardly against the force of the spring 22, the pins 24, 25 planted on the extensions 23, 16 of the subsidiary driving levers 4, 6 engage with the shoulders 26, 27 respectively so as to be pushed upwardly, whereby the subsidiary levers 4, 6 rotate clockwise to carry down their respective blade groups 2, 3 from their positions shown in FIGURE 2 to those in FIGURE 1. A setting of the shutter has thus been effected, resilience having been at the same time stored up in the spring 12 acting on the main driving levers 5, 7. No exposure should take place during the charging-up operation, so it is necessary that there should be no slit whatsoever between the shutter blade groups 2 and 3, while they are moving upwardly. To accomplish this effect, it is necessary to choose the mounting positions of the shoulders 26, 27 on the shaft 20 and those of the pins 24, 25 on the extensions 23, 16 of the subsidiary driving levers 4, 6 so exactly that the shoulders 26, 27 may simultaneously engage with the pins 24, 25 respectively and thrust them upwards at exactly the same time.

When the shutter blades 2, 3 reach their respective lowermost positions as illustrated in FIGURE 1, the above-mentioned arresting lever 19 engages with the projecting pin 17 on the subsidiary driving lever 6 for the second blade group 3, whereby rotation of the lever 6 is checked in spite of the resilient force of the spring 12 urging the main driving lever 7. On the other hand, although there is no such arresting or latching mechanism for the first blade group 2, the return rotation of the subsidiary driving lever 4 due to the resilient force stored up in the spring 12 continues to be prevented by engagement of the shoulder 26 with the pin 24 on the extension 23 of the lever 4, so long as the axially movable shaft 20 is prevented by such suitable means as described below from making return movement downwardly due to the resilient force of the spring 22.

In the illustrated embodiment of the present invention, the arrest of the shaft 20 is effected by arresting its operating lever 28. In other words, the one end of the operating lever 28 is always in engagement with the upper end portion of the shaft 20, so that counter-clockwise rotation of the operating lever 28 about its pivot 29 causes an upward movement of the shaft 20, simultaneously carrying down the shutter blade groups 2, 3 to their set positions, when an arresting lever 30, upon which a spring 33 acts, comes to engage with the operating lever 28 to prevent the clockwise rotation of the lever 28. Consequently, unless the arrest of the operating lever 28 by the lever 30 be released, the downward return movement of the shaft 20 by the spring 22 and, consequently, the driving mechanism of the first blade group 2 are prevented. In the drawings, 31 designates the handle of the operating lever 28, and 32 is the release button for the arresting lever 30.

With the shutter in a completely charged-up condition as described above, if the release button 32 is pushed down, the arresting lever 30 retires and releases the operating lever 28. As a result, the shaft 20 is returned downwardly by the spring 22, when the shoulders 26, 27, which has been in supporting engagement with the pins 24, 25 planted on the subsidiary driving levers 4, 6, move downwardly away from the pins 24, 25, so that the above engagement is released, and the main driving lever 5 for the first blade group 2 rotates counter-clockwise by resilient energy which has been stored up in the spring 12, causing the first blade group 2 to run upwardly. This opens the picture window 1, giving an exposure to sensitive material behind the picture window 1, since the disengagement of the pin 25 from the shoulder 27 does not instantly rotate the driving lever 6 of the second blade group 3, which is still held stationary in the charged-up position by means of the arresting lever 19. In other words there is a time lag between the running of the first blade group and that of the second one. Therefore, the exposure lasts until the second blade group 3 runs upon release of the subsidiary driving lever 6 from the arresting lever 19.

In the illustrated embodiment of the invention, the release of the subsidiary driving lever 6 for the second blade group 3 from the arresting lever 19 is effected through engagement of a cam flange 34 formed on the axially movable shaft 20 with the arresting lever 19. As shown in FIGURE 1, when the shaft 20 is pushed upwardly and the shutter is set, the cam flange 34, which is the release member of the second blade group 3, is held at a position upwardly apart from the arresting lever 19. When the shutter is released by pushing down the release button 32, the shaft 20 is returned downwardly by the force of the spring 22, and the cam flange 34 provided on the shaft 20 kicks off the inclined edge 35 of the arresting lever 19. As a result, the arresting lever 19 sets free the pin 17 planted on the subsidiary driving lever 6 for the second blade group 3, whereby the driving mechanism of the second blade group 3 is released, and resilient energy stored up in the spring 12 rotates the main driving lever 7 counter-clockwise, causing the second blade group 3 to run upwardly. The picture window 1 that has been opened through the previous upward run of the first blade group 2 has thus come to be wholly covered by the second blind plate 3 and the exposure has been completed.

Thus, in the shutter mechanism of the invention, the exposure time is defined by a period of time after the first blade group 2 has run before the second blade group 3 runs. In other words, the exposure time is determined by the time lag between the release of the pin 24 from the shoulder 26 and the kicking off the arresting lever 19 by the cam flange 34.

According to the present invention, the member for kicking off the arresting lever 19 is formed into the cam 34 whose circumference is an involute and whose radius continuously varies in the direction perpendicular to the axis of the shaft 20. Consequently, as the phase angle of the cam 34 relative to the axis of the shaft 20 varies, the position on the inclined edge 35 of the arresting lever 19 where the outer edge of the cam 34 touches said edge 35 also varies. In other words, when the cam 34 is set in a phase angle to be engageable at its larger radius with the arresting lever 19, the outer periphery of the cam 34 will contact the upper part of the inclined edge 35 of the arresting lever 19. On the contrary, when the cam 34 is set in a phase angle to be engageable at its smaller radius with the arresting lever 19, the outer edge of the cam 34 will contact the lower part of the inclined edge 35 of the arresting lever 19. It follows from the above that when the cam 34 contacts the arresting lever 19 at an upper part of the inclined edge 35 thereof so as to kick off the lever 19, the second blade group 3 will be released in a short time after the release of the first blade group 2, giving a short exposure time. On the contrary, when the cam 34 touches the arresting lever 19 at a lower part of the inclined edge 35, a longer exposure time will be given. Thus, according to the present invention, the exposure time can be freely changed and easily controlled by adjusting the phase angle of the cam 34 relative to the axis of the shaft 20. Furthermore, the variation of exposure time may be continuously effected since the phase angle of the cam 34 may be continuously varied by rotating it about its axis, so that a series of continuously different exposure times may be obtained. In order to make the range of exposure times as wide as possible, the length of the inclined edge 35 of the arresting lever 19 may well be made as long as possible, so that the range of displacement of its contact point with the cam 34 may be widened. For controlling the phase angle of the cam 34, the cam may be connected to a suitable shutter speed dial so as to make its phase angle adjustable through the turning of the speed dial. In the illustrated embodiment, the cam 34 is incorporated with the shaft 20 which surrounds its supporting shaft 21 to be axially freely slidable thereon. The two shafts 20, 21 are connected by a pin 36 and a slot 37 to rotate together. Therefore, by mounting a speed dial 38 on the supporting shaft 21, the phase angle of the cam 34 and, consequently, the exposure time can be controlled by turning the speed dial.

In the present invention as fully explained above, through axial movement of the shaft 20, the first blade group 2 and the second blade group 3 are successively released to run, the former a period of time after the latter, and an exposure time corresponding to the time lag between their successive runnings is given to sensitive material through the picture window 1.

Unlike the case of the first blade group 2, the release of the second blade group 3 is effected by engagement of the engaging member 34 formed on the shaft 20 with the spring-urged arresting lever 19 which prevents the release of the second blade group 3. Since the engaging member 34 is formed into a cam whose radius continuously varies in the direction vertical to the axis of the shaft 20, the contact point of the cam with the arresting lever 19 can be displaced by turning the cam. Consequently, any displacement of the contact point results in a change in the kick-off time of the arresting lever 19, and eventually in the exposure time. It may be added that although the shoulder 26 and the cam 34 are parts of a single member in the illustrated embodiment, any other suitable constructions may be employed.

The present invention thus provides a new and useful mechanism wherein, by a simple, single axial movement of the shaft 20, the shutter blades 2, 3 are successively released and the exposure time can be freely and continuously varied by turning the shaft.

What I claim is:

1. In a photographic camera, focal plane shutter mechanism for effecting an exposure through a picture window formed in the frame of said camera, comprising: first and second blade groups each consisting of a main and a subsidiary blade, each of said main and subsidiary blades carried by respective driving levers pivoted on said frame at one side of said picture window, whereby upon movement of said levers for an exposure said blade groups travel linearly across said picture window in the transverse direction to the length thereof; first spring means of substantially S-shape secured at its center to said frame at said one side thereof and having its opposite free ends bearing against said main blade driving levers respectively; a guide shaft mounted on said frame at said one side thereof and extending in the direction of movement of said blade groups; a shaft co-axially surrounding said guide shaft and movable axially thereof; second spring means biasing said movable shaft to a released position; said movable shaft also having a pair of shoulders positioned thereon in spaced relationship, said shoulders simultaneously engaging said subsidiary blade driving levers respectively to set said blade groups in a charged-up position against the force of said wire springs; an arresting lever engageable with said subsidiary blade driving lever of said second blade group when said blade group is in the charged-up position; holding means for holding said axially movable shaft in the charged-up position against the force of said second wire spring; and means for releasing said holding means thereby releasing said movable shaft from said charged-up position whereby said shoulders disengage from said subisidiary blade driving levers causing said subsidiary blade driving lever of said first blade group to drive said first blade group across said picture window and thereafter said movable shaft engages said arresting lever to disengage said arresting lever from said subsidiary blade driving lever of the second blade group causing said subsidiary blade driving lever to drive said second blade group across said picture window following said first blade group.

2. The focal plane shutter of claim 1, wherein said arresting lever is provided with an inclined edge, and said axially movable shaft has a cam positioned thereon whose circumference is an involute and whose radius continuously varies in the direction perpendicular to the axis of said guide shaft, whereby upon release of said movable shaft said involute cam circumference engages said inclined edge of said arresting lever to disengage said arresting lever from said subsidiary blade driving lever of said second blade group whereby said second blade group is driven across said picture window a period of time after said first blade group thereby effecting an exposure; and means is provided for varying the engaging point of said cam circumference with said inclined edge of said arresting lever whereby the period of exposure time may be varied.

References Cited by the Examiner
UNITED STATES PATENTS 2,800,844   7/57   Durst _____ 95—60
2,950,665   8/60   Meixner _____ 95—55

FOREIGN PATENTS 16,137   9/00   Great Britain.

NORTON ANSHER, *Primary Examiner.*
JOHN M. HORAN, *Examiner.*